Sept. 22, 1959 W. B. PRIGG, JR 2,905,144
EVAPORATION FISH FEEDER
Filed March 4, 1957 3 Sheets-Sheet 1
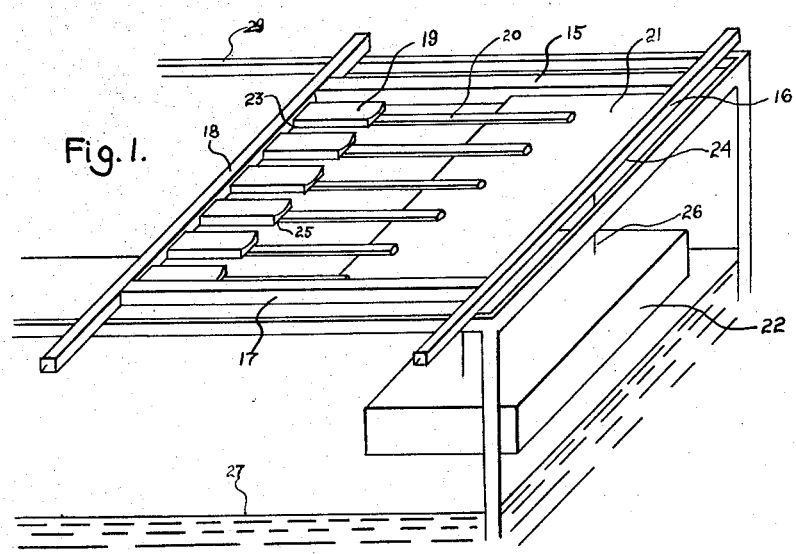
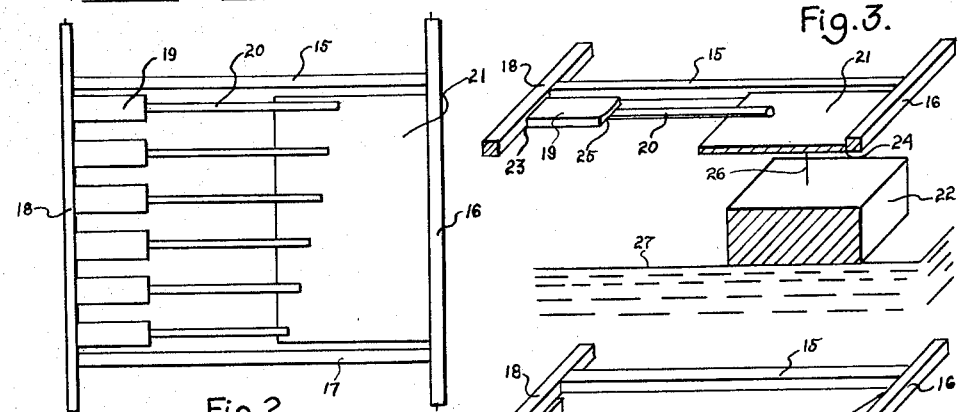
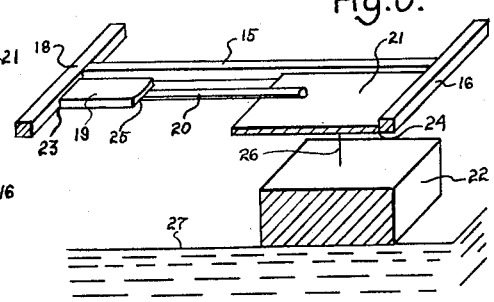
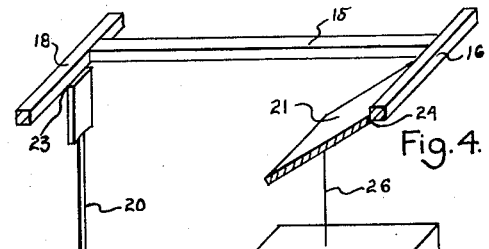
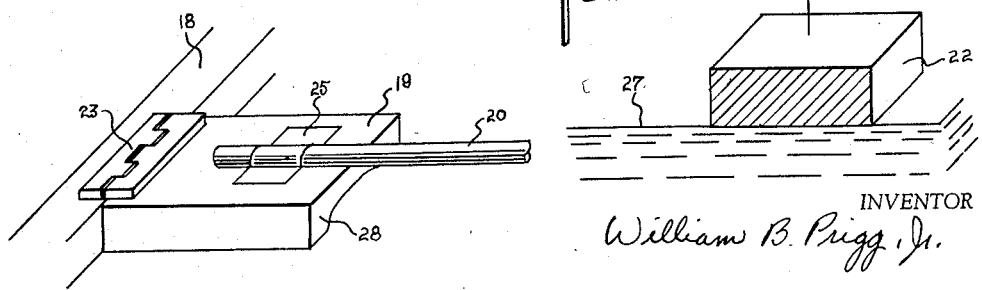
INVENTOR
William B. Prigg, Jr.

Sept. 22, 1959 W. B. PRIGG, JR 2,905,144
EVAPORATION FISH FEEDER
Filed March 4, 1957 3 Sheets-Sheet 2

INVENTOR
William B. Prigg, Jr.

Sept. 22, 1959   W. B. PRIGG, JR   2,905,144
EVAPORATION FISH FEEDER
Filed March 4, 1957   3 Sheets-Sheet 3
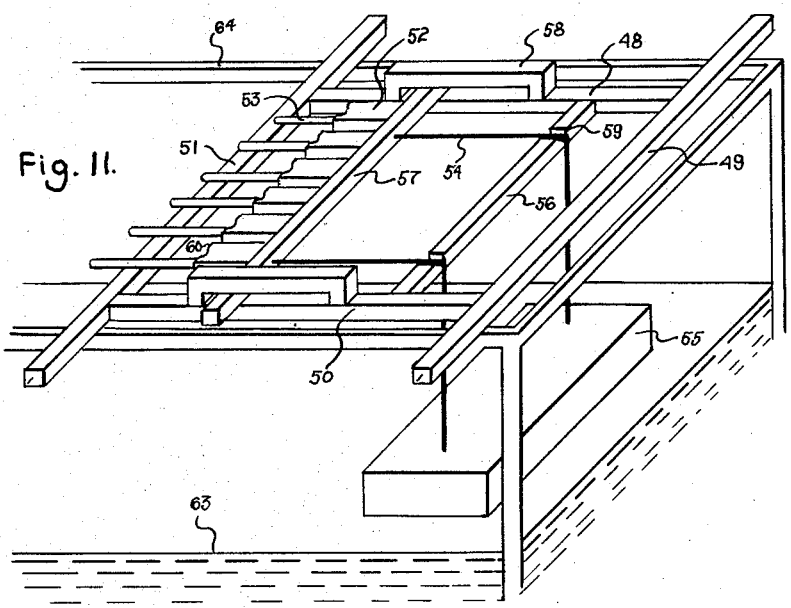
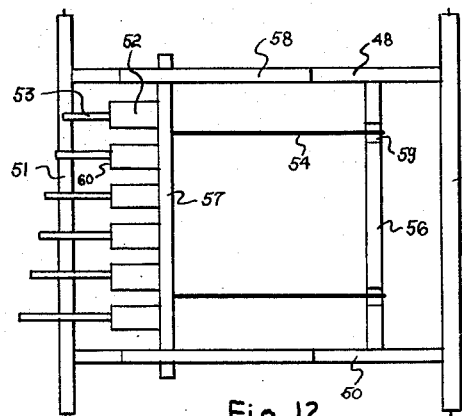
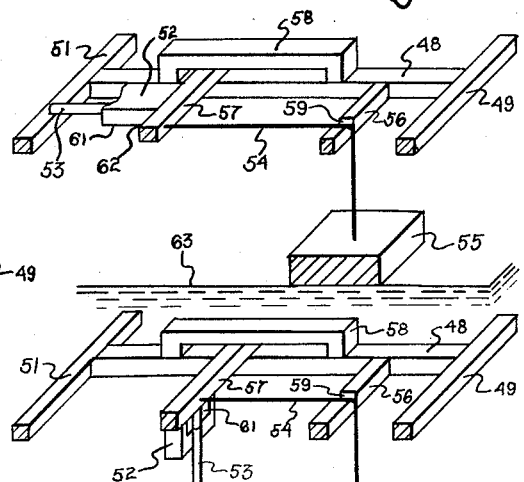
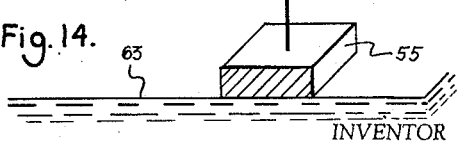
INVENTOR
William B. Prigg, Jr.

United States Patent Office 2,905,144
Patented Sept. 22, 1959

2,905,144

EVAPORATION FISH FEEDER

William B. Prigg, Jr., Chevy Chase, Md.

Application March 4, 1957, Serial No. 643,823

6 Claims. (Cl. 119—5)

*Brief summary of the invention*

A major problem in the raising of fish arises from the difficulty of feeding the fish when they must be left unattended for a period of time. My invention eliminates this problem by using the motivating force of evaporation which will be constant under constant conditions. The main body of the feeder rests on the top of the aquarium; this is adjustable to fit any size of aquarium. The initial adjustments are made on each feed tray arm while float holds activator in level position. As evaporation takes place, float is lowered and in turn allows activator to be lowered by its own weight. This continually increases the distance between activator and feed pod support rods. When rate of evaporation has been established by measuring the distance the water level drops over a period of 24 hours, the adjustable arms on the feed trays can be varied to obtain support by activator for any desired length of time. For example, if evaporation rate in the aquarium is approximately ¼ inch a day, the lengths of the feed tray arms would vary by ¼ inch in series. This, of course, will release one feed tray every 24 hours. This would not hold true for all of my modifications of this invention because the constant rate of the activator rod moving across the fish feeder would not always equal the constant rate of decline of the float due to evaporation. The ratio between float drop and activator movement may also be varied by mechanical leverage of the activator. This ratio may also be varied by varying the distance of the rods from the float supporting the activator and the hinges of the activator.

Other advantages of this fish feeder are: (a) it does not need to be attached to the aquarium but merely rests on the top; (b) all motivating forces are created within the aquarium; (c) it can be adapted to different styles and sizes of aquariums; and (d) due to simplicity, manufacturing of this device is simple and maintenance is negligible. Various modifications of this invention will be explained in detail in specifications to follow.

*Brief description of the several views of the drawing*

Fig. 1 is a perspective view showing feeder in set position mounted on partial view of aquarium.

Fig. 2 is a plan view of feeder in set position.

Fig. 3 is a cut-away perspective view of feeder in set position showing float support.

Fig. 4 is a cut-away perspective view showing feeder in release position showing float support.

Fig. 5 is a perspective view of inverted feed tray showing adjustable linkage of support rod and hinge.

Fig. 11 is a perspective view of second modification showing feeder in set position mounted on partial view of aquarium.

Fig. 12 is a plan view of second modification of feeder in set position.

Fig. 13 is a cut-away perspective view of second modification in set position showing float support.

Fig. 14 is a cut-away perspective view of second modification of feeder in release position showing float support.

*Detailed description of drawings*

Figure 6:
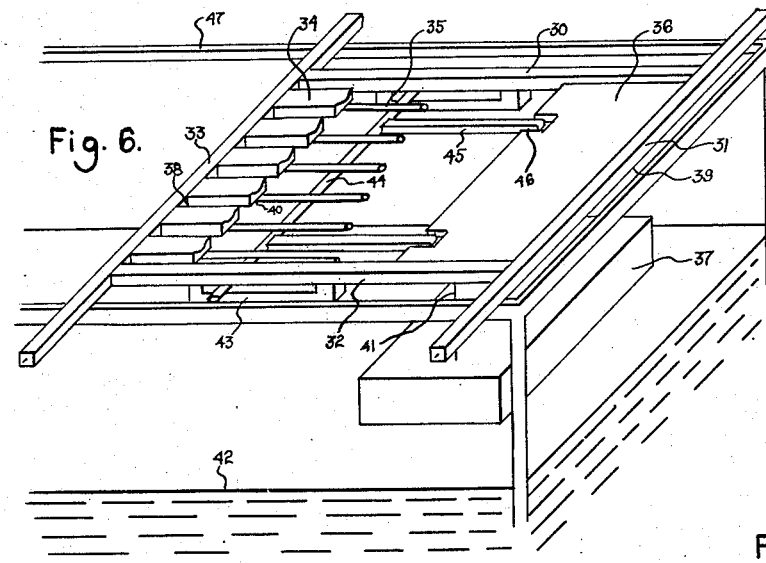
Fig. 6 is a perspective view of first modification showing feeder in set position mounted on partial view of aquarium.

Referring more particularly to Figs. 1, 2, 3, and 4, the frame of the fish feeder has sides 15, 16, 17, and 18. Sides 16 and 18 will extend to adjust to various sizes of aquariums and rest on sides of aquarium 29. The feed trays 19 are hinged to the bottom of frame 18 by hinges 23. Feed tray rods 20 are adjustably mounted to the bottoms of trays 19 so that the length of feed tray rods 20 can be varied to rest on activator 21 at desired intervals. Activator 21 is hinged to the bottom of frame 16 and supports the ends of adjustable feed tray rods 20. A float 22 made of cork, foam plastic, or the like, is positioned below the activator 21. Two adjustable rods 26 attached to float 22 and, extending up from the float, support the activator 21. Varying the point of contact of rods 26 to activator 21 from hinges 24 of activator 21 will vary the ratio of decline of free end of activator 21 and decline of float 22. As evaporation takes place, the water level 27 is lowered, thus lowering float 22 to which rods 26 are attached. This in turn allows activator 21 to lower by its own weight increasing the distance between free end of activator 21 and ends of feed tray rods 20.

Referring more specifically to Fig. 5, feed tray support rods 20 fit snugly into brackets 25 mounted on bottom of feed tray 19. This allows free adjustment of distance between end of rod 20 and front end 28 of feed tray 19. This view also shows hinge 23 mounted to bottom of frame 18 and bottom of feed tray 19 allowing free movement of feed tray 19 when release position is reached.

To accomplish the purpose of the invention, an adequate supply of fish food is deposited in each feed tray 19 for desired intervals. When activator 21 is allowed to lower, the distance between the free end of activator 21 and feed trays 19 exceeds length of feed tray rod 20, allowing unit (feed tray 19 and feed tray rod 20) to pivot downwardly on hinge 23 to a depending vertical position expelling feed contained in feed tray 19 depositing it on surface of water 27. As activator 21 continues to decline, the distance from free edge of activator 21 exceeds pre-adjusted lengths of ends of rods 20 to edge 28 of feed tray 19; therefore, feed trays 19 are released in sequence according to pre-arranged intervals determined by lengths of feed tray rods 20.

Figure 7:
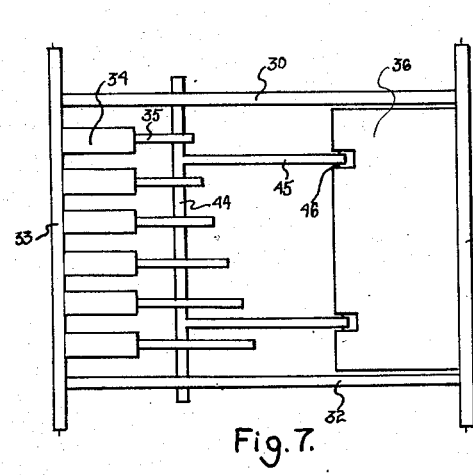
Fig. 7 is a plan view of first modification of feeder in set position.
Figure 8:
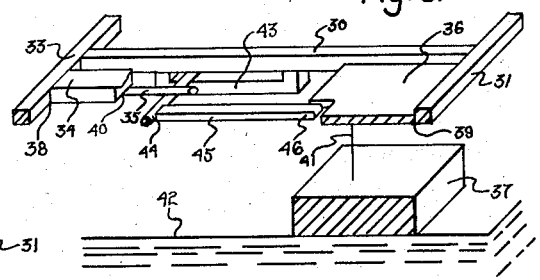
Fig. 8 is a cut-away perspective view of first modification of feeder in set position showing float support.
Figure 9:
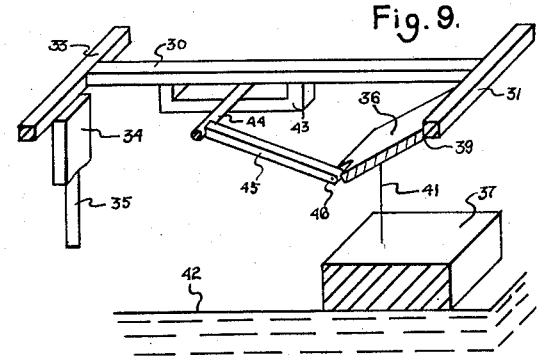
Fig. 9 is a cut-away perspective view of first modification of feeder in release position showing float support.
Figure 10:
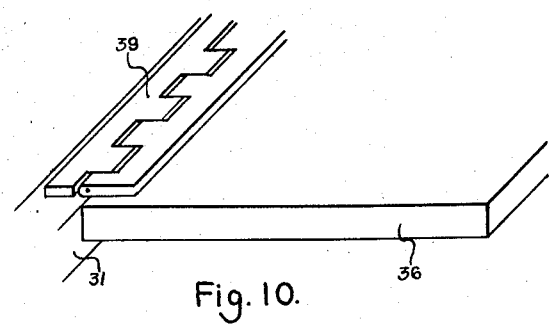
Fig. 10 is a partial view of inverted activator showing hinge.

Referring more specifically to Figs. 6, 7, 8, 9, and 10, the frame of the fish feeder has sides 30, 31, 32, and 33. The sides 31 and 33 will extend to adjust to various sizes of aquariums and will rest on sides of aquarium 47. The feed trays 34 are hinged to the bottom of frame 33 by hinges 38. Feed tray rods 35 are adjustably mounted to the bottoms of trays 34 so that the length of feed tray rods 35 can be varied to rest on activator rods 44 at desired intervals. Activator 36 is hinged to linkage rod 45 by hinge 46. The other end of linkage rod 45 is attached to activator rod 44. Activator rod 44 supports the ends of adjustable feed tray rods 35. A float 37 is positioned below activator 36 on water level 42. Two adjustable rods 41 attached to float 37 and extending up from the float support the activator 36. Varying the points of contact of rods 41 to activator 36 from hinges 39 of the activator will vary the ratio of decline of the end of activator 36 to which linkage rods 45 are hinged by hinge 46 and the decline of the float 37. As evaporation takes place the water level 42 is lowered, thus lowering float 37 to which rods 41 are attached. This allows activator 36 to lower by its own weight. Linkage rods 45 attached to activator 36 by hinges 45 are also lowered. Linkage rods 45 are attached at the ends opposite hinges 46 to activator rod 44. As activator 36 and linkage rods 45 pivot on hinges 46, activator rod 44 is pulled toward frame 31, sliding in activator rod 43 which is supported by frames 30 and 32. This in turn increases the distance between activator rod 44 and feed trays 34. When distance between activator rod 44 and ends 35 of feed tray 34 exceeds length of feed tray rods 35, the unit (consisting of feed trays 34 and feed tray rods 35) is released and allowed to pivot downwardly to a vertical position on hinges 38 expelling feed contained in feed trays 34 depositing it on surface of water 42. As activator 36 continues to decline, the angle of activator 36 and linkage rods 45 decreases at hinge point 46 thus drawing activator rod 44 closer to frame 31 and increasing the distance between ends 47 of feed trays 34 and activator rod 44. As the distance from activator rod 44 exceeds pre-adjusted length of ends of rods 35 to edge 47 of feed trays 34, the feed trays 34 are released in sequence according to pre-arranged intervals determined by lengths of adjustable rods 35. Activator rod 44 is round to allow for slow turn created by mechanical linkage of activating mechanism.

The feed tray rod adjustment in this modification is identical to Fig. 5.

The basic advantage of this first modification over the original is the fact that feed trays 34 will remain level up to the point of release eliminating the remote possibility of spillage.

Referring more specifically to Figs. 11, 12, 13, and 14, the frame of fish feeder has sides 48, 49, 50, and 51. Sides 49 and 51 will extend to adjust to various sizes of aquariums. They rest on sides 64 of aquarium. The feed trays 52 are hinged to the bottom of activating arm 57 by hinges 62. Feed tray rods 53 are adjustably mounted to the bottoms of trays 52 so that the lengths of the feed tray rods 53 can be varied to rest on the top of frame 51 at desired intervals. Activating rod 57 rests on frames 48 and 50 and slides freely in activating rod slides 58. Attached to activating rod 57 are two strings 54 extending horizontally from activating rod 57 to guide notches 59 in rod 56. Strings 54 extend down and are attached at two points to float 55 which is on water level 63. As evaporation decreases water level 63, float 55 is lowered thus pulling strings 54 through guide notches 59 in rod 56. At guide notches 59 the pulling force is changed to a horizontal motion, thus pulling activating rod 57 to which strings 54 are attached away from frame 51. As activating rod 57 to which unit (feed tray 52 and feed tray rod 53) is attached by hinge 62 is pulled away from frame 51, the distance between ends 60 of feed trays 52 and frame 51 is increased. When this distance exceeds the distance of ends 60 of feed trays 52 and the ends of feed tray rods 53 which are supported by frame 51, unit (feed tray 52 and feed tray rod 53) will be released and pivot on hinge 62 to a vertical position thus expelling the food deposited on feed trays 52 depositing it on the surface of water 63. As the distance between activating rod 57 and frame 51 continues to increase, and exceeds pre-adjusted length of ends of rods 53 to edges 60 of feed trays 52, the feed trays 52 are released in sequence according to pre-arranged intervals determined by lengths of rods 53 expelling feed loads to water level 63.

The feed tray rod adjustment in this modification is identical to Fig. 5.

The basic advantage of this modification over original and first modification is that the float is directly attached to the feeding mechanism as opposed to floats supporting activator thus creating two separate units.

While in accordance with the patent statutes I have illustrated and described the best forms and embodiments of my invention now known to me, it will be apparent to those skilled in the art that other changes may be made in the apparatus described without deviating from the scope of my invention as set forth in the following claims.

I claim:

1. Apparatus for periodically depositing material into a liquid-containing tank as the level of the liquid progressively decreases due to evaporation, comprising a horizontal first member supported by the tank above the level of the liquid therein, a plurality of trays pivotally connected at one end about horizontal pivot axes to said first member along the length thereof, each of said trays being adapted to receive said material thereon, a horizontal second member supported by said tank adjacent said first member and releasably supporting all of said trays in substantially horizontal positions, and liquid level responsive actuating means connected to at least one of said members to progressively displace the same relative to the other of said members as the level of liquid in the tank falls to successively release the trays supported by said second member, whereby the trays successively pivot downwardly by gravity to discharge the material thereon onto the surface of the liquid.

2. Apparatus as defined in claim 1 wherein said first member and said second member are substantially parallel, and further wherein each of said trays has a rod adjustably connected thereto and longitudinally extending therefrom substantially at right angles to said first member, said rods being axially adjustable relative to their associated trays and being in engagement with the upper surface of said second member so that said second member normally supports each of said trays in a substantially horizontal position, the portions of the rods extending from at least two of said trays being of unequal lengths, whereby as one of said horizontal members is progressively displaced relative to the other of said members, the rods of said two trays will be released from said second member at different time intervals.

3. Apparatus as defined in claim 2 wherein said first member constitutes an element of a frame supported by said tank, and further wherein said liquid level responsive means comprises a float buoyantly supported on the liquid surface, a horizontal activator member normally substantially co-planar with said first and second horizontal members, one side of said activator member being pivotally connected to said frame and the opposite side of said activator being connected to said second member by linkage means, and means connecting said activator member to said float to initially position said activator member in a substantially horizontal position, whereby as the level of the liquid progressively decreases due to evaporation and the height of the float drops, the activator member will pivot downwardly to progressively displace said second member relative to said first member to successively release the trays.

4. Apparatus as defined in claim 3 wherein said second horizontal member is guided within said frame for lateral movement relative to said first member.

5. Apparatus as defined in claim 2, wherein said first horizontal member constitutes an element of a frame supported by said tank, said second horizontal member being pivotally connected at one side to said frame, and further wherein said liquid level responsive means comprises a float buoyantly supported on the liquid surface, and means connecting said second member to said float to initially position said second member in a substantially horizontal position, whereby as the level of the liquid progressively decreases due to evaporation and the height of the float drops, the second member will pivot downwardly to successively release the trays.

6. Apparatus as defined in claim 2, wherein said second horizontal member constitutes an element of a frame supported by said tank, said first horizontal member being guided in said frame for horizontal lateral movement relative to said second member, and further wherein said liquid level responsive means comprises a float buoyantly supported on the liquid surface, and flexible string means guided by said frame and connected at one end to said float and at the other end to said first member to progressively displace said first member laterally away from said second member as the liquid level drops upon evaporation to successively release the trays.

References Cited in the file of this patent

UNITED STATES PATENTS

| | | |
|---|---|---|
| 590,109 | Mather | Sept. 14, 1897 |
| 1,112,918 | Kuxmann et al. | Oct. 6, 1914 |
| 1,212,892 | Bourek | Jan. 16, 1917 |
| 1,251,820 | Porphir | Jan. 1, 1918 |
| 1,989,298 | Tingley | Jan. 29, 1935 |
| 2,014,089 | Sabini | Sept. 10, 1935 |
| 2,754,800 | Gare | July 17, 1956 |
| 2,761,422 | Martin | Sept. 4, 1956 |